N. CRANE.
WIRE WINDING MACHINE.
APPLICATION FILED APR. 1, 1915.
1,307,620.
Patented June 24, 1919.
6 SHEETS—SHEET 5.
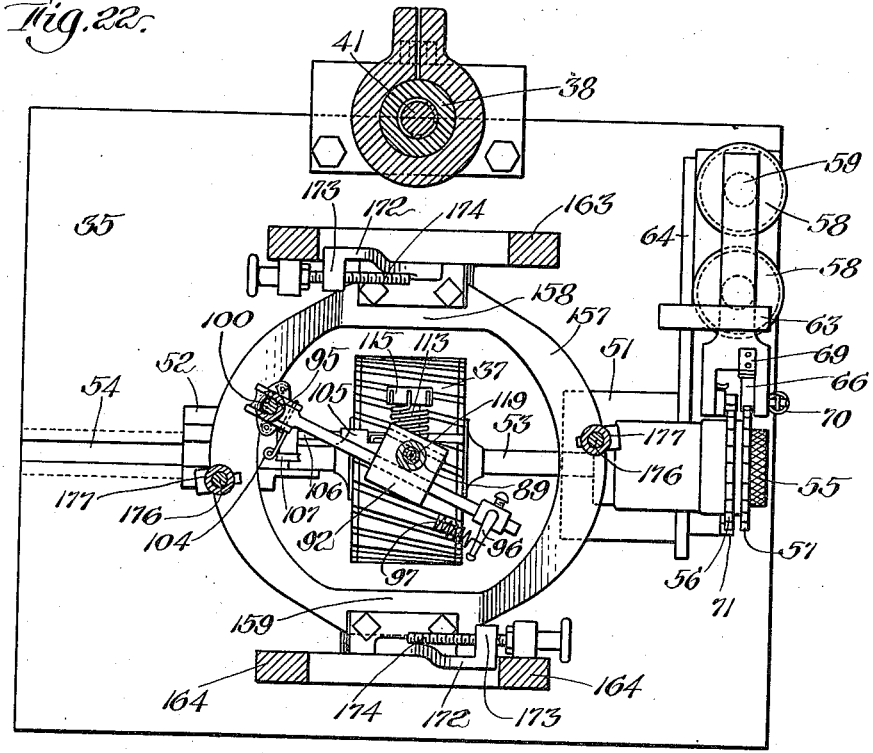
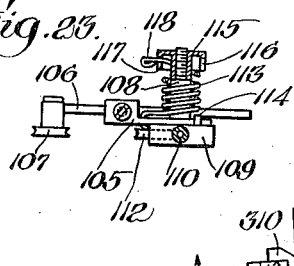
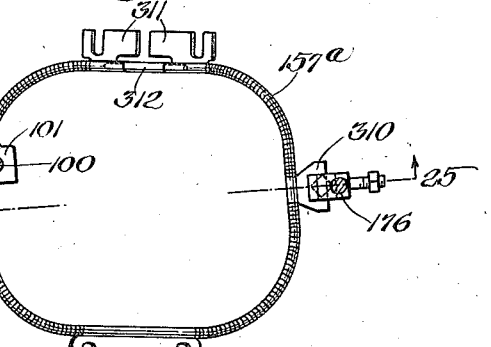
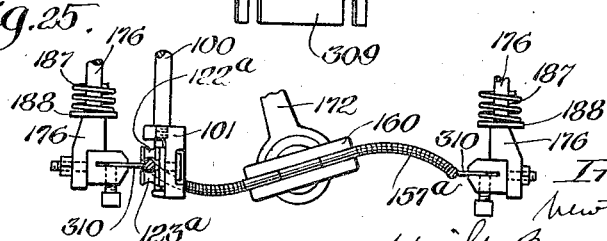
Inventor:
Newton Crane
by Wright, Brown, Quinby & May
Attorneys.

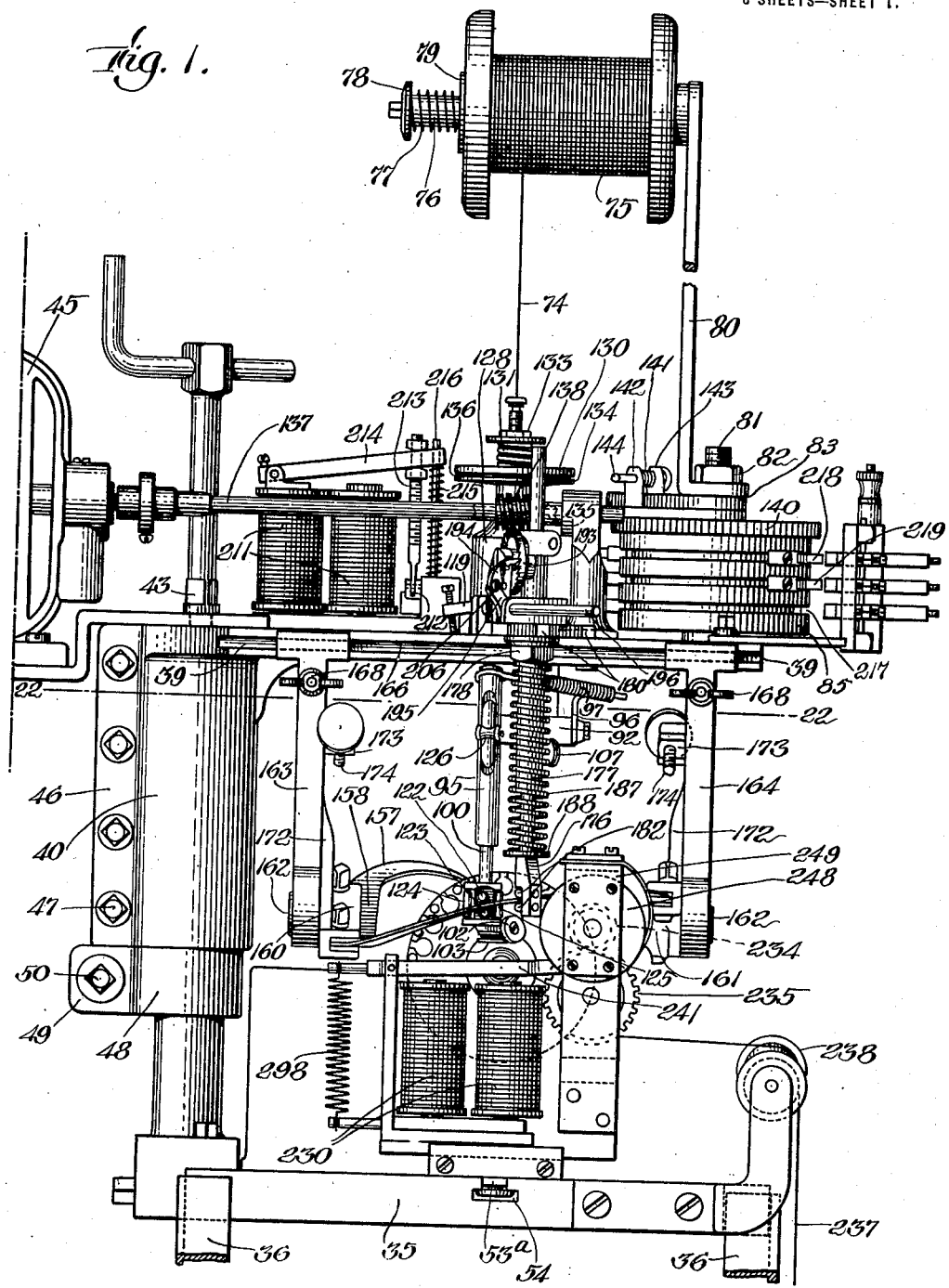

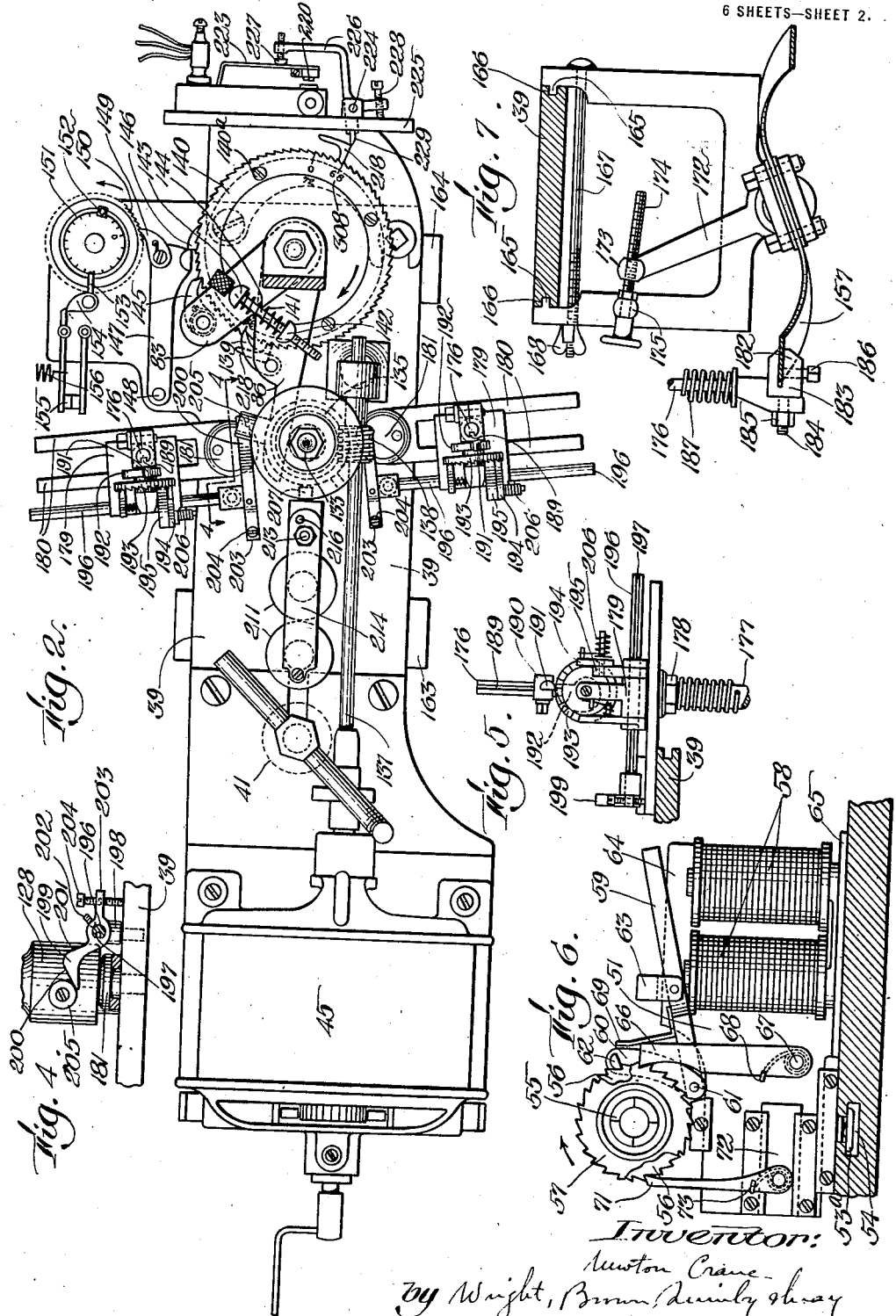

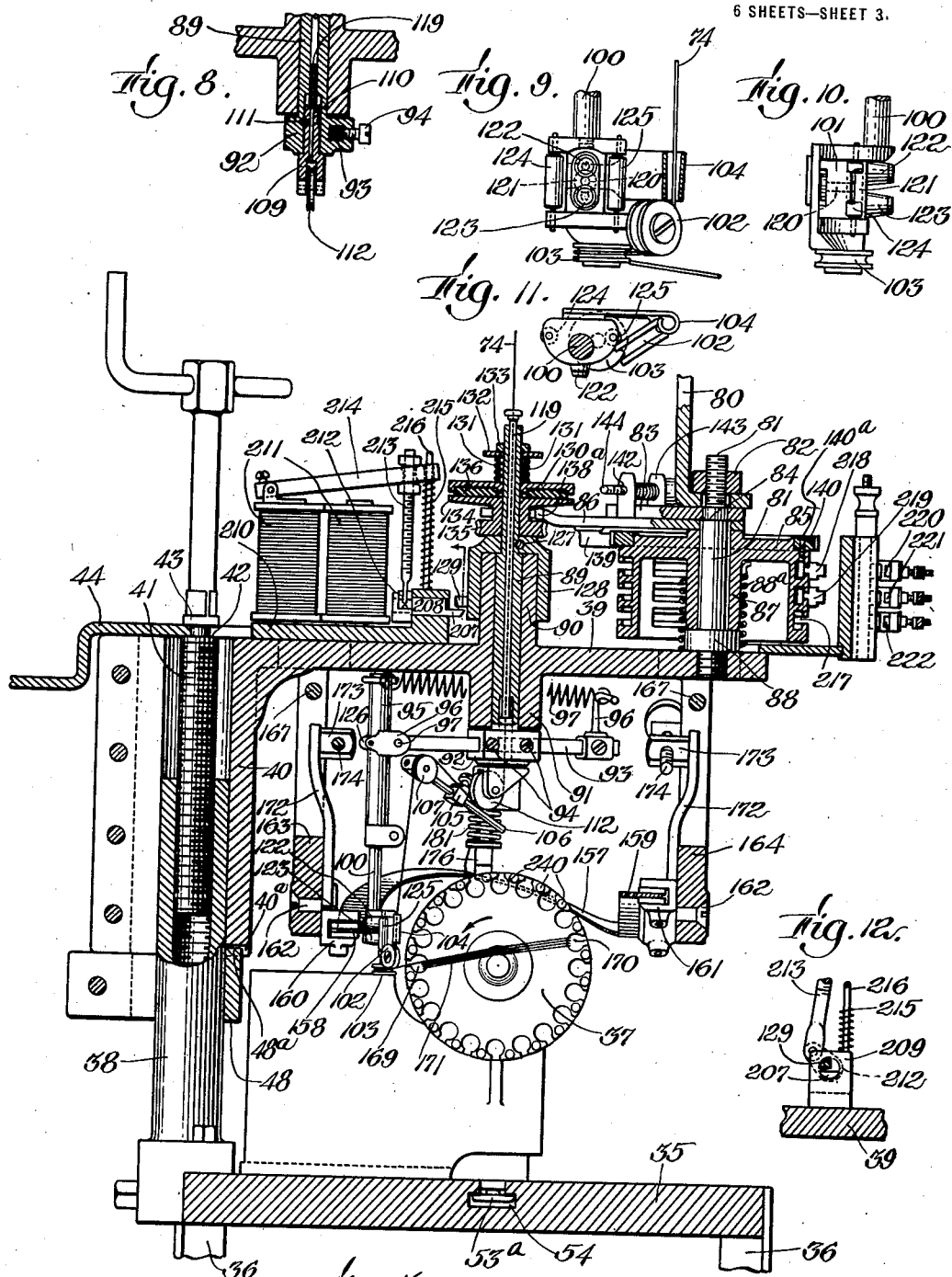

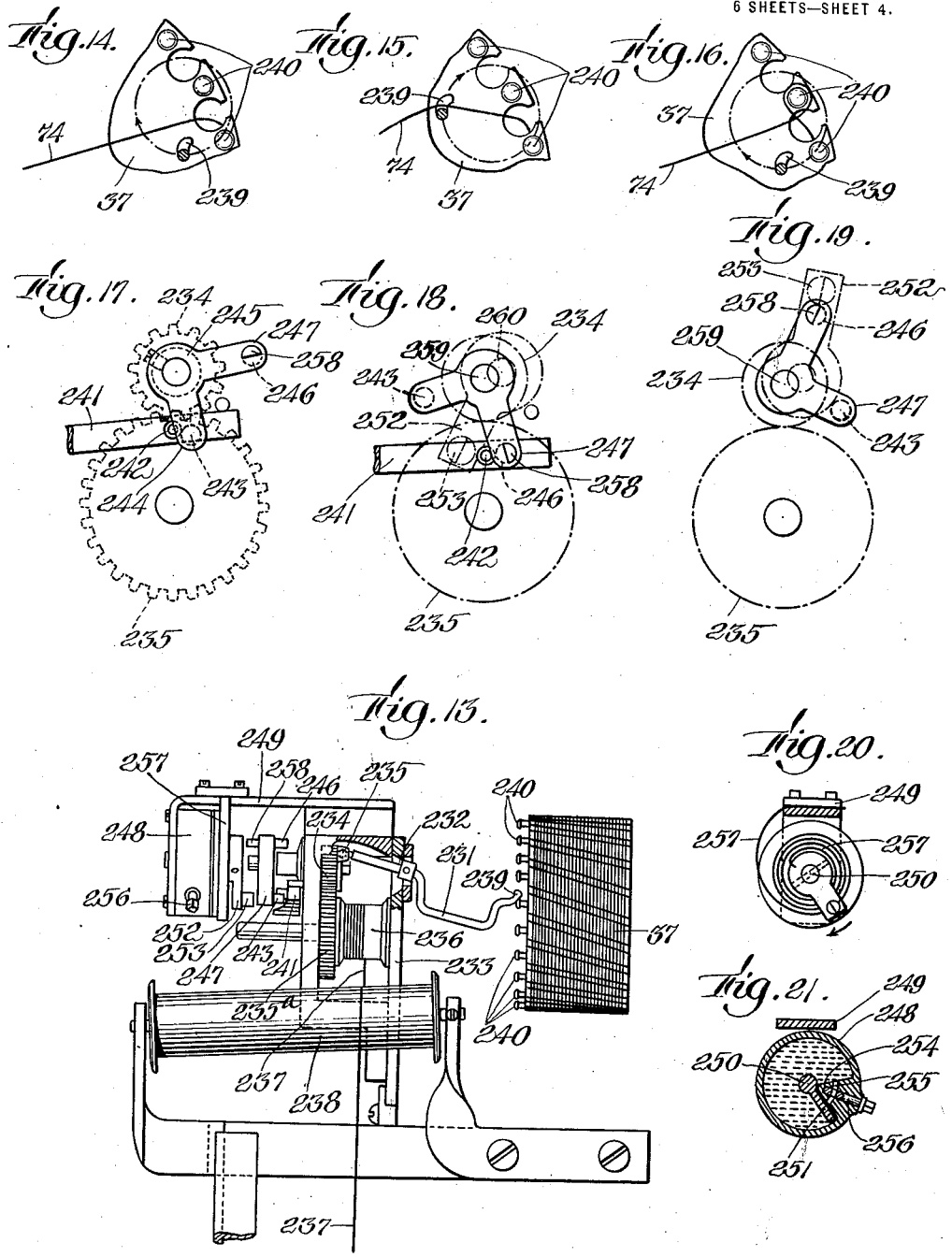

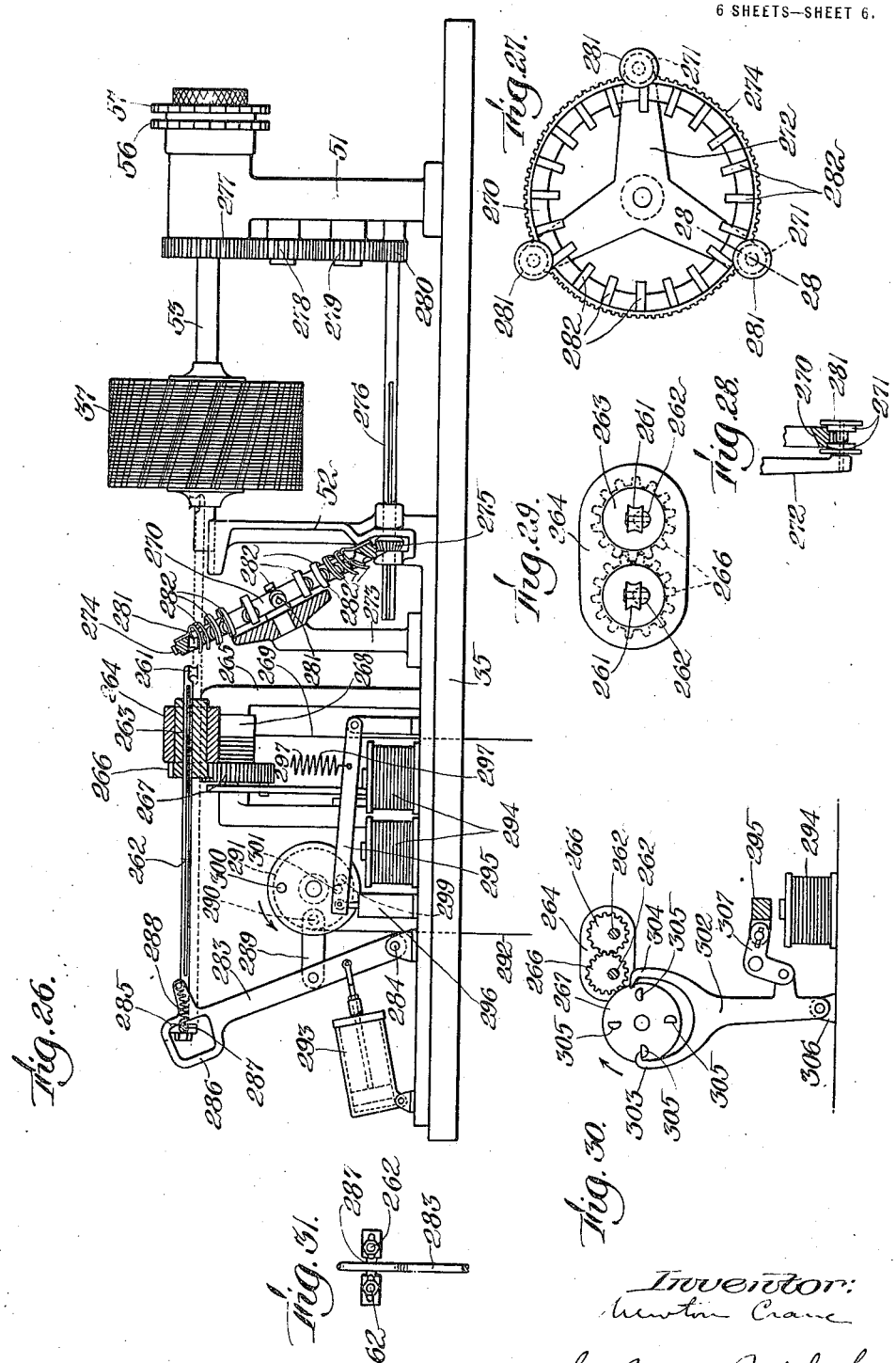

UNITED STATES PATENT OFFICE.

NEWTON CRANE, OF BOSTON, MASSACHUSETTS.

WIRE-WINDING MACHINE.

1,307,620.  Specification of Letters Patent.  Patented June 24, 1919.

Application filed April 1, 1915. Serial No. 18,492.

*To all whom it may concern:*

Be it known that I, NEWTON CRANE, a citizen of the United States, and resident of Boston, in the county of Suffolk and State of Massachusetts, have invented certain new and useful Improvements in Wire-Winding Machines, of which the following is a specification.

The present invention relates to a wire winding machine particularly adapted for winding the coils of armatures. The object of the invention is to provide first, a machine capable of laying the wire upon the armature drum in any course required by the character and formation of the drum; second, to provide automatic means operative at predetermined times for forming a loop in the wire; third, to provide means for causing successive windings in the coils of a drum armature to take the shortest course in crossing the ends of a drum armature; fourth, to make a machine of the sort indicated which shall be entirely automatic; and fifth, to provide capacity for adjustment of the machine to armatures of different sorts and sizes. In the drawings wherein I have shown a form of winding machine embodying the principles of my invention, Figure 1 is an elevation of the machine.
Fig. 2 is a plan view.
Fig. 3 is a vertical central section.
Fig. 4 is an elevation of a detail.
Fig. 5 is an elevation of another detail.
Fig. 6 is an elevation of the electromagnetic means for indexing the armature.
Fig. 7 is a detail view partly in elevation and partly in section of one of the adjusting means.
Fig. 8 is a section,
Fig. 9 a front elevation,
Fig. 10 a side elevation and
Fig. 11 a plan view of the wire leading or laying device of the machine.
Fig. 12 is a detail of the automatic stop or arrester for the wire laying device.
Fig. 13 is a side elevation of the device by which loops are formed in the wire.
Figs. 14, 15, and 16 are fragmentary views showing the different positions of the loop former in forming a loop in the wire.
Figs. 17, 18, and 19 are views showing positions of the mechanism which operates the loop former corresponding to the positions of the loop former shown in Figs. 14, 15, and 16, respectively.
Fig. 20 is an end elevation and
Fig. 21 a sectional view of the damping device which controls the operation of the loop former.
Fig. 22 is a plan view of the parts below the line 22 of Fig. 1, the parts cut by such line being shown in elevation.
Fig. 23 is a detail elevation of a tension adjusting device forming part of the wire leader.
Fig. 24 is a plan view and
Fig. 25 is a cross section on line 25 of Fig. 24 illustrating a modified form of construction of wire leader guide.
Fig. 26 is an elevation of another construction of loop forming mechanism.
Fig. 27 is an elevation of a detail of such mechanism.
Fig. 28 is a detail sectional view on line 28 of Fig. 27.
Fig. 29 is an elevation of another part of the loop forming mechanism.
Fig. 30 is an elevation of the escape mechanism by which the operation of this loop forming device is controlled.
Fig. 31 is a detail of the loop forming device.

Like reference characters indicate the same parts in all the figures.

For a general outline of the machine, reference is made first to Figs. 1, 2, and 3. 35 represents a table which forms part of the base of the machine and which is supported by legs 36, fragments of which are shown. This table supports the armature to be wound, which is indicated by 37. A hollow post 38 rises from one edge of the table and supports an overhanging arm 39 by which the wire laying mechanism and the driving and controlling mechanisms are carried. A split sleeve 40 on arm 39 surrounds the post 38 and carries a screw 41 which engages threads in the interior of the post. The screw has a shoulder 42 and a collar 43 between which lies the lip of a bracket 44 fixed upon the arm 39, which bracket carries the driving motor 45. Flanges 46 are formed on the sleeve 40 at each side of the slot thereof and receive screws 47 by which the sleeve may be tightened so as to bind on the post. A split collar 48, provided with ears 49 and clamping screw 50, surrounds the post and serves as a stop or support to limit the downward movement of the sleeve 40 and arm 39. It has a key 48ᵃ adapted to enter a notch 40ᵃ in sleeve 40; this key and notch having abutments which locate the arm properly as to the direction in which it projects from the post. Screw 41 is used to raise the arm and the parts depending therefrom clear of the armature to permit of such parts being swung aside when the armature is placed in or removed from the machine.

Standards 51 and 52 contain bearings for the armature shaft 53 (see Fig. 22) and such standards are adjustable upon the table 35, each having a stud 53ᵃ with a head contained in an undercut groove 54 in the table, whereby said standards may be adjusted. One of the bearings for the armature shaft is a clutch sleeve 55 shown in Fig. 6 which is rotatable in the standard 51 and to which are secured ratchet wheels 56 and 57. These ratchets are operated by an electromagnetic mechanism to index the armature after the winding of a coil has been completed, preparatory to winding the next coil.

This indexing mechanism is shown in Figs. 6 and 22. It includes an electromagnet 58, an armature lever 59, and a pawl 60 carried by the short arm of the lever 59 on a pivot 61 and having a tooth 62 arranged to engage the teeth of ratchet 56. Lever 59 is pivoted to a bracket 63 fixed on a plate 64 which rises beside the magnet from the base 65 on which the magnet is supported. A stop pawl 66 is pivoted at 67 on the plate 64 and has its toe in the plane of the ratchet 57. It is constantly urged away from such ratchet by a spring 68, and is pressed toward the ratchet by a wiper 69 on the pawl carrying arm of lever 59. The teeth of ratchet wheels 56 and 57 are inclined opposite ways, as appears from Fig. 6, and the stop pawl 66 coacts with the ratchet 57 to prevent over-rotation of the armature when being indexed. It will be understood from Fig. 6 that when the armature is attracted and the pawl 60 is raised, the wiper 69 releases pawl 66, which then moves clear of the ratchet 57. Upon return of the pawl, moved by a spring 70, (Fig. 22) the wiper forces pawl 66 into the path of the teeth on ratchet 57 so as to stop such ratchet when the armature has been indexed far enough. A pawl 71 pivoted on a slide 72 and urged toward the ratchet 56 by a spring 73 prevents backward rotation of the armature. Thus after indexing the armature is held by two positive stops against turning in either direction. Slide 72 is adjustable on the standard 51 and the magnet base is adjustable with respect to the standard, to accommodate larger or smaller indexing ratchets than those here shown, having the same tooth spacing for armatures with a greater or less number of slots. This arrangement avoids any necessity of altering the throw of armature lever 59 and pawl 60 for larger or smaller ratchets.

The wire to be wound upon the armature is marked 74, and it is brought from a spool 75 mounted on a spindle 76 and held under sufficient tension by a spring 77 between a disk 78 on the end of the spindle and a friction washer 79 which bears on the adjacent head of the spool. Such spindle is fixed to an upright 80 which rises from a stud 81 fixed in the arm 39, the upright being clamped between a nut 82 on the stud and an arm 83 which latter is forced by the same pressure against a shoulder 84 on the stud. Stud 81 also furnishes the bearing for a member 85 which I will call a timing drum (and will describe later) and an arm 86 which intermittently moves said timing drum. Such drum has a hub or a sleeve portion 87 surrounding stud 81 and resting on a collar 88 at the base of said stud, the distance between the collar 88 and shoulder 84 being enough to permit the drum and the arm 86 to turn freely without being bound by the arm 83. A spring 88ᵃ coiled helically around the hub 87 and the collar 88 serves as a friction brake or drag to resist yieldingly the rotation of the drum. This spring is coiled tightly enough to bind against the hub and collar and is wound in such a direction that the rotation of the timing drum in the normal direction tends to unwind it. It is thus enabled to exert constantly a frictional drag and also a resilient resistance to the rotation of the drum, but without binding tightly enough to prevent such rotation in the normal direction.

The wire passes from the spool through a tubular shaft 89 which turns within a bearing in the arm 39, such bearing being formed in part by a hollow post 90 above the arm and in part by a similar post 91 below the arm. The tubular shaft passes entirely through the bearing and carries a wire layer or leader on its under end. This leader is constructed as follows, reference being had particularly to Figs. 3, 8, 9, 10, and 11.

A block or head 92 formed or attached in any desired way to the lower end of the tubular shaft 89 has a guideway in which a horizontal arm 93 is fixed adjustably in place by set screws 94. On the end of this arm a tubular guide 95 is swiveled by means of two ears 96 on said guide, and a pivot pin 97 passing through the ears and the arm 93. On the other end of the arm or bar 93 is a post 96 to which is connected one end of a spring 97, the other end of which is connected to the tubular guide 95. A rod 100 slides telescopically in the guide 95 and carries on its end a head 101 on which are journaled guide wheels 102 and 103 for the wire, and to which also is fixed a wire guiding eye 104. This eye and the guide wheels are so arranged that the wire passes through the eye tangent to one side of the wheel 102, passes partly around and under this wheel and thence tangentially to the wheel 103 and partly around the latter. Wheel 103 is the delivery element of the wire layer.

Between the eye 104 and the tubular shaft 89 through which the wire passes is a yielding take-up and tension device, Figs. 8 and 23, constituted by an arm 105 having a channel in which is an extension rod 106 carrying a guide pulley 107. The said arm is pivoted upon a stud 108 projecting from the side of a block 109 which is provided with a hollow stem 110 projecting into the lower end of the shaft 89 and secured therein by a key 111 (Fig. 8). The bore of the stem 110 is in line with the bore of the shaft 89 and receives the wire. The guide wheel 112 is mounted in the block 109 with its rim tangent to the passage in the latter, and also in the same plane with the guide wheel 107. A spring 113 is coiled around the stud 108 so as to press upwardly on the under side of arm 105, normally holding the latter raised, as shown in Fig. 3, and acting against the pull of the wire. A stop pin 114 mounted in the block 109 limits the downward movement of arm 104 under the pull of the wire, and a similar stop pin beneath the pin 114 on the under side of the arm 105, and therefore not shown in Fig. 23, limits the upward movement of the arm under influence of spring 113. The abutment for the spring is a nut 115 threaded on the stud 108 and formed with a flange 116 having notches 117, any one of which is adapted to receive the end 118 of the spring; wherefore by slipping such end from the notch containing it and winding it around the stud, the slipping it into another notch, the spring may be tightened or loosened.

A tube 119 passes through the bore of the shaft 89 and ends in the enlarged mouth of the passage in stem 110, to facilitate threading the wire through the leader device.

The head 101 on the leader has mounted upon it by means of a pivot 120 a block 121 carrying two antifriction rolls 122 and 123, these rolls being respectively above and below the pivot 120 and being slightly separated. The head also carries two upright antifriction rolls 124 and 125 on respectively opposite sides of the block 121. The purpose of these rolls will be later explained.

The side of the tubular guide 95 opposite to the arm 93 is cut away (Fig. 1) and in the opening so formed is pivoted an antifriction roll 126 between the lugs 96, which is adapted to bear on the sliding rod 100. The guide 95 and rod 100 constitute a telescopic or extensible shank for the head of the wire leader to permit certain movements of the latter as will be presently described.

On the outside of the shaft 89 there is fixed by means of a key 127 a thimble 128 which rests upon and embraces the post 90 and carries a stud 129. Splined slidably on the shaft at a slight distance above the thimble 128 is one of the disks 130 of a disk friction clutch, which disk is pressed upon by a spring 131 abutting against a washer 132 held adjustably on the shaft by a nut 133. The other member 134 of the friction clutch is a disk formed integral or otherwise rigidly connected to a worm wheel 135, said disk and wheel being loose upon the tubular shaft and resting loosely on the thimble 128. A washer of frictional material 136 is between the two disks of the friction clutch.

The armature of the driving motor 45 is coupled to a shaft 137 which carries a worm 138 meshing with the worm wheel 135. This mechanism constitutes the drive for the wire leader, such drive being a frictional one and adapted to be interrupted by any obstruction sufficiently powerful to overcome the force of the friction clutch. The same drive intermittently and slowly rotates the timing drum 85 through a roll 138ª carried by the worm 135 and which is arranged to strike and move the arm 86, a pawl 139 on the arm 86, and a ratchet wheel 140 in the same plane with the pawl 139 and complemental thereto. This ratchet wheel is an annulus fixed to the timing drum by screws 140ª (Fig. 2), preferably in the manner shown in Fig. 3. The arm 86 is retracted and held in the path of roll 138 by a spring 141 which is interposed between studs 142 and 143 on the arms 86 and 83, respectively, and is held in place by a screw pin 144, which passes freely through the stud 143 and through the helix of the spring 141 and is threaded into the stud 142. A non-return pawl 145 is mounted on the arm 83 to prevent backward movement of the timing drum.

Said drum operates a counter and automatic circuit breaker for stopping the operation of the machine at a predetermined point. For this purpose a wiper 146 is provided on the drum so as, upon every rotation of the drum to strike and move a pawl carrier 147 pivoted at 148 upon the main shaft arm 39 and carrying a pawl 149 which engages a ratchet wheel 150. The latter has a groove 151 in which there is adjustably fixed a dog 152, the latter being arranged to strike a trigger 153 connected to a cam 154 which controls a switch 155 in the circuit of the motor 45. When the cam is in the position shown in Fig. 2 it holds the switch closed, but when the dog 152 strikes the trigger it displaces the cam and allows the switch to be opened by a spring 156.

A feature of great importance to my invention is a means for guiding the movement of the wire layer so as to cause the same to travel in an irregular path. By "irregular" in this connection I include any path which is otherwise than a path of revolution uniformly distant at all points from a rotating axis. The means for accomplishing that purpose in the present invention is a track 157 which is of irregular outline and successive points of which are also not in the same plane. The track here illustrated is one of a number of forms which may be employed for armatures of different designs, and is designed for winding a drum armature having grooves for the reception of the wire coils which are inclined or skewed with respect to the axis of the armature. Each coil is designed to occupy two grooves situated on respectively opposite sides of the axis, which grooves accordingly have opposite inclinations, that is, are not parallel. The purpose of the track or cam is to guide the leader along the groove or slots in opposite faces of the drum and across the ends of the drum from the end of one groove to the beginning of that on the opposite side of the drum. The track shown in Figs. 1, 3, and 22 is an endless annular piece of flexible sheet metal, being preferably cut in one piece from a metal sheet, the metal being sufficiently flexible for the purpose in view. Its opposite side portions 158 and 159 are gripped by clamps 160 and 161, respectively, which have pivot studs 162 contained in frames 163 and 164 which hang from the arm 39. These frames are wide enough, as shown in Fig. 7, to embrace the arm and they have tongues 165 contained in grooves 166 in the opposite edges of the arm, whereby the frames may be adjusted. A rod 167 passes through the opposite members of each frame and carries a nut 168 by which the members of the frame may be drawn together to clamp them upon the arm. The adjustment permitted thereby, as appears from Fig. 1, enables the holding clamps to be placed so as to accommodate tracks, similar to the track 157 of larger or smaller outline.

The track is held so as to embrace the upper part of the armature drum, as appears clearly from Figs. 1, 3, and 22. The part 158 of the track is inclined parallel to one of the grooves or slots on the adjacent side of the drum, and the part 159 is inclined parallel to a slot on the other side of the drum. The particular slots to which these parts are thus parallel, when the armature is in the position shown in the drawings, are the slots 169 and 170, respectively, in which a part of a coil 171 is represented in Fig. 3 as being laid. Preferably the clamps by which the portions 158 and 159 of the track are gripped, are curved in such a way as to curve such portions conformably to the helical curvature of the slots 169 and 170, respectively. The intermediate portions of the track are warped to form a sufficiently smooth curve from the high end of the part 158 to the low end of part 159, and the reverse, and such portions guide the wire layer while passing over the ends of the drum to lead the wire from the low end of the slot 169 to the high end of the slot 170, and vice versa.

The track guides the wire layer through its engagement with the rolls 122, 123, 124, and 125, which are mounted upon the head 101 of the wire layer. Such head is placed inside of the circuit of the track with the inner edge of the latter entering the space between the rolls 122 and 123. The spring 97, by pulling on the upper end of the guide 95, forces the head toward the guiding edge of the track and holds the rolls 124 and 125 in contact with such edge, yielding to permit in and out movements of the head due to eccentric contours of the track. The wire layer being carried in a path of revolution about the shaft 89, when the latter is rotated, traverses the track and is moved alternately up and down when traversing the sides of the armature drum and when crossing the ends thereof. In these up and down movements of the wire laying head, the telescopic shank is alternately shortened and lengthened by movement of the head in the guide 95. These movements are imparted to the head with the minimum of friction through the guide rolls; and in this connection an important feature resides in the pivoted mounting of the block 121 which carries the guide rolls 122, 123. As such block is able to turn freely on a horizontal axis it accommodates itself to the different inclinations of the track 157, allowing the guide rolls to place themselves so that their line of centers is approximately normal to the part of the track with which they may be engaged at any instant, thereby avoiding at the same time both lost motion and liability to bind or cramp upon the track. The tapered or conical formation of the guide rolls enables the laying head to accommodate itself to the helicoidal portions of the track, without binding. The extreme edge portion of the track, however, is at all times between the bases of the rolls, where the intermediate space is just wide enough to accommodate the track, so that there is at no time sufficient lost motion to endanger the proper placing of the wire in the slots of the armature in which it is designed to lie.

Provision is made for adjusting the track for armatures of different designs, that is, having slots with a greater or less inclination. For this purpose the clamps 160 and 161 are pivoted to their supporting frames, as already intimated and each is provided with an adjusting arm 172 carrying a swivel head 173 which has a tapped passage engaged with a screw 174 carried in a swivel head 175 of the adjacent frame, as shown in Figs.

3 and 7. By this means the clamps may be turned so as to place the track portions 158 and 159, carried thereby either horizontal, that is parallel to the axis of the armature, or at any inclination between horizontal and the extreme limit of permitted adjustment. The track is made of sufficiently flexible material to permit of being bent to the extent necessary for this adjustment.

Provision is made for shifting the portions of the cam track which cross the ends of the drum from time to time in order to lay the strands of wire, or some of them, side by side and avoid piling all of the strands on top of one another. For this purpose I provide a holder at each side of the track intermediate the clamps. The two holders and the parts associated with them respectively are alike and are designated by the same reference characters, wherefore the following description of one suffices for both. The holder shown here, Fig. 1, is a rod or bar 176 passing through a sleeve 177 which is clamped by means of a nut 178 threaded thereon and a head 179, to a forked or slotted bar 180 which is between the said nut and head, with its members straddling the sleeve or tube 177, and is fixed to the arm 39 in a manner permitting angular adjustment, upon a headed stud 181. The lower end of bar 176 lies outside of the track and has fingers 182, embracing the outer edge of the track. In Fig. 7 the fingers appear as formed by a slot in a block 183, which is secured by the bar 176 by a shank 184 and a nut 185, the edge of the track being contained in the slot and secured by a set screw 186. This holder bar is constantly pressed downward in a yielding manner by a spring 187 surrounding the same and the tube 177 and confined between the nut 178 and a collar 188 on the holder bar. This bar passes entirely through the tube 177 and protrudes above the head on the latter, being adapted to slide in the tube and provided with a keyway 189 (Figs. 2 and 5) by which it is held from rotating. A clamp 190 is fixed adjustably on the bar above head 179 and is provided with a stud 191, which rests against the rim of a cam 192 (Figs. 2 and 5) which is journaled on a stud carried by the head 179. A ratchet wheel 193 is connected with the cam and has teeth on its outer face adapted to be engaged by a pawl 194 carried by an arm 195 splined upon a rock shaft 196, which passes through a bearing in the head. This rock shaft has a keyway or spline 197 by which the pawl carrying arm 195 is splined to it in a manner permitting adjustment of the head lengthwise of the shaft. The inner end of the shaft 196 is journaled in a fixed bearing piece 198 and it carries a cam arm 199 having cam surfaces 200 and 201 on opposite sides of an intermediate elevation (see Fig. 4). This cam arm is fixed to the shaft 196 by a set screw 202 and is provided with an arm 203 wherein is contained an adjustable stop screw 204. The cam arm extends into the path of a roll 205 carried by the thimble 128 on the shaft 89 of the wire leader. The two cam surfaces on the cam arm are provided to permit the same cam arm to be used upon either side of the thimble, there being two of these arms and one operated while the roll 205 moves toward its rock shaft and the other while the roll moves away from the rock shaft. The spring which holds pawl 194 against the ratchet, such spring being shown at 206 in Fig. 5, reacts through the arm 195 upon the cam arm, holding the latter raised and maintaining the stop 204 against the base which is provided by the arm 39. I may of course provide an additional spring for raising the cam arm 199 if spring 206 is not sufficient for the purpose.

The operation of the mechanism last described is the following: As the shaft 89 revolves roll 205 strikes first one cam arm 199 and then the other. Each cam arm when depressed by the roll actuates the pawl 194 to turn the ratchet wheel 193 one notch and thereby turn the cam 192 in the direction in which it raises the bar 176. After the highest point of the cam passes the finger 191, the latter drops to the lowest point of the cam, when the cam has the outline shown in dotted lines in Fig. 5. Of course any form of cam adapted to permit a gradual lowering as well as a gradual raising of the track holder may be provided. The effect is that the portion of the track which crosses the end of the drum is shifted for each traverse of the wire layer, whereby such layer is enabled to lay the strands of the wire side by side to a certain extent, thereby enabling the wires to be spread out across the end of the drum instead of being grouped into a deep pile close to the shaft. After many strands have been carried across the end of the drum, when several coils have been wound, the shortest course for the wire to cross the drum is not necessarily in the horizontal projection of the line between the ends of the slots in which it is being laid, but is often to a greater or less extent to one side of such line, on the same principle that a "great circle" course is the shortest distance between two points on the earth's surface. The shifting of the track above described enables the wire to take the shortest course across the end of the drum between slots.

The mechanism above described for shifting the end portions of the track is merely one of several means I may employ, all essentially the equivalent of each other, for causing the threads or strands laid in successive traverses across the end of the armature drum to lie beside one another, or in other words, to take the shortest course between slots across the end of the drum.

Part of my invention involves means for stopping the operation of the wire laying mechanism after the completion of each coil for a time long enough to permit drawing off wire to form a loop and to permit indexing of the armature. For thus stopping the laying device I provide a finger 207 (see Figs. 3 and 12) which projects eccentrically from the end of a block 208 which is mounted in a bearing 209 so that it can turn about its own axis. This bearing is provided in the base 210 of an electromagnet 211 which is mounted on the overhanging arm 39 of the frame. A crank 212 is fixed on the block 208 and is connected by means of a connecting rod 213 with the armature lever 214 of the electromagnet. A spring 215 which is guided by a rod 216 tends constantly to raise the armature lever and hold the connecting rod, crank 212, and member 208 where the finger 207 projects below the path of the finger 129 on the thimble 128; that is the finger 207 normally underlies the path of 129. When the magnet 211 is energized the armature lever 214 turns block 208 so as to place finger 207 across the path of finger 129, whereby said finger is arrested and the movement of the wire layer stopped, the friction clutch then slipping while the worm wheel 125 continues to revolve.

Normally the magnet 211 is inactive and it is controlled by the timing drum 85 which has a number of circumferential slots 217 in its outer face, in which are adjustably mounted dogs 218, 219, etc., (Figs. 2 and 3). These dogs travel in parallel planes and each is adapted to operate a switch, indicated at 220, 221, and 222, respectively. Each switch, Fig. 2, consists of a fixed contact and a movable contact carried by a spring arm 223, and a lever which is pivoted at 224 on a fixed plate 225 has an arm 226 provided with an adjustable head 227 which bears against the spring arm 223. An adjustable stop 228 bears on the plate 225, being held thereto by the resilience of the spring 223. A short arm or trigger 229 projects from the lever into the path of the dog which operates it, there being of course one lever to be operated by the dog of each group. While the dog acts on the lever, the switch controlled thereby remains closed and the length of the dog determines the time during which the closed condition of the switch continues. These dogs may be made of any circumferential length and may be shifted into any position upon the timing drum. As long as the dog 218 holds the switch 220 closed, assuming that this switch is in the circuit of magnet 211, the wire layer is held from movement by the means just described.

While the switch 220 remains closed the dog 219 closes another switch 221, for example, and actuates an electromagnet 230 on the base 35, which controls the operation of a looping device. Such device is shown in Figs. 1 and 13 and its operation in Figs. 14 to 19. The looper itself comprises a bent arm 231 having the equivalent of a ball and socket bearing in an aperture 232 in a standard 233 which rises from the base 35 and may be a part of the bearing standard 52 for the armature shaft. A pinion 234 carries a socket 235 which receives a ball on the inner end of the arm 231 at a point eccentric to the axis of the gear. This pinion is driven by a gear 235$^a$ on a drum 236 which latter is rotated by a cord 237 passing over a drum 238 and supporting a weight. The weight and cord are merely one form of motor, for which a spring is the equivalent for driving the gearing described. The looper arm 231 has a finger 239 which projects toward the adjacent end of the drum and near the periphery thereof. Pins or studs 240 are set into the drum between the wire-receiving grooves of the latter. When the armature 241 of the magnet 230 is attracted, a stud 242 thereon is moved below a stud 243 on the arm 244 of a bell crank escape lever 245 which is fixed on the shaft of the gear 234, thereby allowing the gear to be rotated until a stud 246 on a longer arm 247 of the escape lever strikes the pin 242. The movement of the armature is just enough to bring the pin 242 out of the way of stud 243 into the way of stud 246. This movement of the gear shifts the looper finger 239 from the position shown in Fig. 14 to that shown in Fig. 15 in the direction of the arrow in a path indicated by a broken line circle in these figures. Upon breaking of the magnet circuit when the dog 219 allows the switch 221 to open, the armature is released and is raised until its pin 242 clears the stud 246 and lies in the way of the stud 243, when the escape device completes its revolution, and the looper also completes its revolution, winding the wire about the pin 240 on the armature which lies within the path of the looper. Normally the looper lies where it will not interfere with the pins as the drum is indexed, and also beneath the wire running from the adjacent coil to the wire layer, wherefore the described movement of the looper is enabled to pick up the wire and wrap it about one of the pins, thereby providing a loop which may be later brought into connection with a segment of the armature commutator.

I provide a damper or dash pot to prevent too rapid rotation of the looper under the pull of the driving weight. This damper is shown in Figs. 13, 20, and 21, also diagrammatically in Figs. 18 and 19. It is a drum 248 fixed to a bracket 249 and containing centrally a shaft 250 on which there is a plate 251. The shaft has an external arm 252 carrying a stud 253. Within the drum is an abutment 254 projecting from the wall close to the shaft 250 and having a channel 255 through it, the size of which is adjustable by means of a valve 256. A spring 257 is fastened to the external arm 252, coiled about the shaft 250 and its outer end fastened to the bracket 249. On the arm 247 of the escape lever is a stud 258, the path of which crosses the path of stud 253. The axes of the escapement lever and the dash pot shaft are out of line to the extent and in the direction indicated by the small circles 259 and 260, whereby the stud 258 is enabled to strike the stud 253 upon leaving the position shown in Fig. 18 and passes by the stud 253 when in the position shown in Fig. 19, which is just before the escape stud 243 strikes the pin on the armature lever. While the arm 252 is thus rotated, the plate or rotary piston 251 in the dash pot displaces a body of viscous liquid such as oil or glycerin in the chamber 248 through the passage 255. When the escape lever is released from the damper arm the spring 257 returns the arm and piston to the normal position.

The operation of the looper occurs whenever the dog 219 closes and opens the switch 221. Two or more loops may be formed in the course of winding a single coil and in such case a like number of dogs 218 and 219 will be provided for respectively arresting the winding operation and actuating the looper as above described at the required times.

When the looping action takes place at the conclusion of winding of the coil, the arrest of the winding mechanism is continued long enough to permit an operation of the switch 222 by a dog in the third groove 217, which actuates the indexing magnet 58 and turns the armature drum far enough to bring another pair of slots into the path of the wire layer.

A modified construction of looper is shown in Figs. 26 to 31. This looper consists of two studs or fingers 261 on rods 262 mounted parallel to one another and each passing through, and splined in an eccentric passage in a block 263 mounted to rotate about its axis in a bearing 264 supported in a standard 265 rising from the base 35. The blocks 263, which are preferably cylindrical, are provided with intermeshing gear pinions 266, one of which is driven by a gear 267 having connected to it a drum 268 whereon a weight supporting cord 269 is wound. As in the other form the weighted cord is merely one type of motor for driving the gearing.

The rods 262 extend toward the armature and are movable from the full line position shown in Fig. 26, which is the normal position, to the dotted line position close to the drum. In the dotted line position the fingers or studs project upwardly between the end of the drum and the course followed by the wire layer when crossing such end, whereby the wire is caught by these fingers.

Between the extreme positions of the fingers 261 is a ring or annulus 270 which is supported by rolls 271 on the arms of a three armed spider 272 which is centrally fixed upon a post 273, the rolls engaging the periphery of the ring 270 and being formed to give free passage to a line of teeth 274 on the periphery of the ring. These teeth are engaged by a beveled gear 275 splined upon a shaft 276, which is journaled in the uprights 51 and 52 in which the armature shaft has its bearings, and is driven from the armature shaft through a gear train 277, 278, 279, 280, the ratio of which is such that the ring 270 is turned with the same angular velocity as the armature when the latter is indexed. On the inner periphery of the ring are a number of pins 281, equal in number to the slots in the armature each of which pins is protected by a deflector 282, extending across the pin at the side thereof toward the armature and across the end of the pin, but leaving the opposite side of the pin exposed. In each stopping place of the ring one of the pins with its deflector is between the paths traversed by the two fingers 261. For retracting the rods 262 carrying the fingers 261 I provide a lever 283 pivoted to a bracket 284 on the base and having abutments 285 and 286 on opposite sides of a crossbar 287, in slots of which the ends of the two rods 262 are confined. A spring 288 holds the crossbar against the abutment 285. These abutments are separated far enough to make provision for yielding lost motion between the lever and the rods. The lever is operated through a link 289 by a crank 290 carried by a motor operated drum 291, of which the motor is indicated as a weight supporting cord 292. The movements of the lever are damped by a dash pot 293 of ordinary construction connected with the lever. The controlling electromagnet is designated 294 and its armature 295, the latter being damped by a dash pot 296, and being urged away from the magnet by a spring 297. The armature 241 of the magnet 230 in the first-described looping mechanism, by the way, is urged in the same manner by a spring 298.

Armature 295 carries a stop pin 299 adapted to coact with escape pins 300 and 301 carried by the drum 291 at different distances from the axis thereof, so that when the armature is raised stop 299 is in the way of stud 301 but clear of stud 300, and when lowered is in the way of stud 300 and clear of 301. Armature 295 also operates an escapement in connection with the motive mechanism for turning the blocks 263. This mechanism consists of an escape lever 302 having arms 303 and 304 which coact with four escape pins 305 on the face of the driving gear 267. The lever 302 is pivoted to a bracket 306 and is operated from the armature 295 through a bell crank 307. When the armature is attracted escape arm 303 releases the pin which engages it and the gear 267 is permitted to turn through nearly one fourth of a revolution, or until the pin in advance of the one just released by arm 303 reaches arm 304; but when the armature is allowed to rise and the escape arm 304 releases the adjacent stud, escape arm 303 comes in front of the next pin following that one which was released when the armature was attracted, and the gear does not turn an appreciable amount. This effect is due to the fact that the distance from the abutting face of arm 303 to arm 304 in the direction of rotation is less than half a turn of the gear. The gear ratio between gear 267 and the pinions 266 is 2 to 1, whereby said pinions are given a half turn, approximately, at each escape of the motor mechanism. The blocks 263 are thus turned in relatively opposite directions and the rods 262 revolved in such a manner as to invert the fingers 261. In turning from the upright position to the inverted position the fingers turn toward one another, due to the fact that the driving gear rotates in the direction of the arrow shown in Fig. 30.

The operation of this looping mechanism is as follows: The dog which operates the controlling switch for the magnet 294 closes such switch just before the wire laying device is arrested. The first part of the movement thereby given to the armature 295 displaces the escape lever 302 far enough to release the pin 305 which bears against it. The dash pot or damper 296 makes the motion of the armature so slow that the stop pin 299 does not release the escape pin 301 until after the weight driven gear 267 has turned the blocks 263 and therewith the fingers 261 from the inverted position to the upright position. As there is no dash pot for this mechanism, such movement takes place almost instantly. Continuing, armature 295 releases pin 301 and the drum 291 is allowed to turn half a turn, until arrested by the escape pin 300 striking stop pin 299, whereby the rods and fingers are transferred from the forward position to the dotted line rearward position near the armature. This operation is so timed in relation to the time of the arrest of the wire layer, that the latter is caused to lay one strand of the wire over the fingers. In other words, the stoppage of the wire layer is so timed as to cause one strand and no more of wire to be laid across the fingers after the latter have been brought to the dotted line position. The magnet circuit is then broken, allowing the armature to rise and release the pin 300, whereupon the arm 283 is caused to move forwardly, pulling the fingers after it, and drawing off a loop from the wire, of which the part passing between the fingers is deflected by one of the guards 282 and carried under and past the adjacent stud 281. At this time the escape arm 304 is released and the arm 303 brought into position to arrest the second escape stud 305. Then the armature circuit is again closed, either by means of a second dog 219, or by so constructing a single dog that it causes two closings and openings of the switch 221 in succession. The second movement of the armature so produced causes the bearing blocks 263 to be rotated another half turn, thereby inverting the fingers 261, and thereafter the fingers are pushed a second time toward the armature. In this last movement the loop is between the fingers and the sides thereof are brought close together and so held at points close to the armature. The fingers remain in this position after the wire layer has been again started in operation and until enough turns have been made to prevent the tension of the wire layer from straightening out the sides of the loop. Then the circuit of the magnet 294 is a second time opened and the fingers are returned to normal position. Each loop after being formed is moved out of the way when the armature drum is indexed by the rotation of the ring 270, which latter is inclined in order that the distance between any one of its pins and the point from which the loop engaged with that pin leaves the armature may remain approximately the same in all positions. This looping mechanism provides a means for holding loops out of the way of subsequent windings in connection with armatures of ordinary construction, and without requiring the special construction of armature illustrated in Figs. 1, 3, and 13, which is equipped with pins, or with sockets in which pins may be placed.

A modification of the track and of that portion of the wire layer which engages the track is shown in Figs. 24 and 25. Here track 157$^a$ has a round or approximately round cross section and the guide rolls 122$^a$ and 123$^a$ which embrace the track are curved, their outer ends being closer together than the diameter of the track, wherefore the rolls alone cause the wire layer to follow the outline of the track, horizontally as well as vertically, and it becomes unnecessary to provide a spring 97 for that purpose. The antifriction pressure rolls 124 and 125 of Figs. 9 and 10 are also unnecessary and may be omitted. The modified track may be made of flexible wire or other suitable material, or may be a closely coiled helical spring, where extreme flexibility is desired. It is or may be mounted and adjusted in the manner already described in connection with the track 157, having ears 309, 310 and 311 for connection with the clamping means and the shifting means, already described, for respectively holding the track in place and displacing those portions thereof which cross the ends of the armature drum. This track further is constructed with two ends which are coupled together by a sleeve 312, and the lug 311 is divided opposite to this sleeve so as to permit disconnection of such ends when the carrier or wire leader is to be placed on or removed from the track. As the outer end of the space between the rolls 122ª and 123ª is narrower than the track, the only way in which the track can be placed between the rolls is by dividing it at some point, such as the point where the sleeve 312 is located, and passing it endwise between these rolls.

The ratchet wheel 140 of the timing drum has a known number of teeth and is provided with graduations and numerals, or other index marks 308 near the teeth for guidance in setting the dogs so as to cause the operations heretofore described to take place at the desired times when a predetermined number of turns of the wire leading winder have been made.

What I claim and desire to secure by Letters Patent is:

1. An armature winding machine comprising means for supporting an armature, a wire winding member, and a guide or track arranged to constrain the movement of said member to a path conforming to the outline of the coil, said guide being adjustable so as to vary such path.

2. In a wire winding machine, a traveling wire layer, means for driving said wire layer about an axis, and means for continuously shifting said layer first in one direction and then in the opposite direction parallel to said axis twice during each revolution of the layer; whereby the wire being wound is laid in the form of a warped coil.

3. An armature winding machine, comprising a wire laying member, a rotary driver therefor adapted to propel said wire layer in a circuit, said laying member being connected to said driver flexibly in a manner permitting a variation in the distance thereof from the axis of the driver, and guiding means constraining the said laying member to travel in a path conforming generally to the outline of the coil to be wound.

4. An armature winding machine comprising means for supporting an armature core, a wire layer, means for moving said wire layer in a circuit about that portion of the core on which a coil is to be wound, and means for displacing the path of the layer progressively in successive traverses thereof across the ends of the core, whereby to enable strands of the wire crossing the ends of the core to lie beside one another.

5. In an armature winding machine, a track or guide forming a closed circuit and having a form generally similar to that of the coil or winding to be made, whereof different portions lie in different planes.

6. An armature winding machine comprising in combination a supporting and holding means for an armature core, a wire laying member, driving and guiding means including a friction clutch for causing said laying member to travel about that portion of the core whereon wire is being wound, indexing means for said core, and a controlling means for obstructing the motion of said wire laying member at predetermined times and for causing operation of the indexing mechanism while the wire laying member remains at rest, said friction clutch being adapted to slip at such times.

7. An armature winding machine comprising means for holding an armature core, a wire laying device, means for causing said wire laying device to travel about the portion of the core whereon wire is wound, said means including a constantly traveling driving member, and a driven member connected to the wire laying device and frictionally driven by the driving member, a stop carried by the driven member, and a complemental stop normally out of the path of the first-named stop and adapted to be placed in such path for arresting the travel of the wire laying device.

8. An armature winding machine comprising means for holding an armature core, a wire laying device, means for causing said wire laying device to travel about the portion of the core whereon wire is wound, said means including a constantly traveling driving member, and a driven member connected to the wire laying device and frictionally driven by the driving member, a stop carried by the driven member, a complemental stop normally out of the path of the first-named stop, a timing device driven by said driving member, and automatic mechanism controlled by said timing device for placing the complemental stop periodically in and out of said path, whereby to arrest the motion of the wire laying device.

9. A wire winding machine comprising in combination, a support for an armature core, a wire laying device, and means for causing the same to travel in a circuit about that part of the core whereon wire is being wound, a loop forming mechanism, means for causing said mechanism periodically to draw a loop from a strand of the wire, and holding means for loops formed and arranged to hold such loops clear of subsequently laid turns of the wire.

10. An armature winding machine comprising a base, means on said base for supporting an armature core, a post rising from said base, an arm overhanging said base having a sliding bearing on said post, and wire winding mechanism carried by said arm, said arm being movable about the post clear of the armature core.

11. An armature winding machine comprising a base, a post rising from said base, an arm overhanging said base and having a hub slidingly supported on said base, being movable both endwise and angularly with respect to the post, and a stop or abutment fixed on the post constructed to hold said arm at a predetermined distance from the base and at a definite angle with respect thereto, and wire winding mechanism carried by said arm.

12. An armature winding machine comprising a base having means for supporting an armature core, a post rising from said base, an arm overhanging the base mounted to slide on and turn about said post, a screw swiveled to the arm and threaded into the post for raising and lowering the arm, and wire winding mechanism carried by the arm.

13. An armature winding machine comprising a base having means for supporting an armature core, a post rising from said base, an arm overhanging the base mounted to slide on and turn about said post, a screw swiveled to the arm and threaded into the post for raising and lowering the arm, and wire winding mechanism carried by the arm, and a stop fixed on the post for limiting the distance of said arm from the base.

14. An armature winding machine comprising a base having means for supporting an armature core, a post rising from said base, an arm overhanging the base mounted to slide on and turn about said post, a screw swiveled to the arm and threaded into the post for raising and lowering the arm, and wire winding mechanism carried by the arm, said post and arm having complemental abutments to locate the arm in a definite position over the armature core.

15. An armature winding machine comprising a base having means for supporting an armature core, a post rising from said base, an arm overhanging the base mounted to slide on and turn about said post, a screw swiveled to the arm and threaded into the post for raising and lowering the arm, wire winding mechanism carried by the arm, a stop mounted on the post to limit the approach of said arm toward the base, said stop and the arm having complemental abutments to fix the arm in a definite position as to its direction of lateral projection from the post.

16. In an armature winding machine in combination with a wire laying device, driving means for operating said device, a loop forming mechanism, an armature indexing mechanism, and a timing member having means for periodically arresting the movement of the wire laying device, and causing the loop forming mechanism and the armature indexing mechanism to operate during the arrest of said device.

17. In a wire winding machine having means for supporting an armature, a wire laying device and driving means for causing said device to wind wire about a part of the armature, a loop forming mechanism, a timing member constantly driven and means through which said timing member successively causes arrest of the driving means for the wire laying device, and operation of said loop forming mechanism while the wire laying device remains stationary.

18. In a wire winding machine having means for supporting an armature, a wire laying device and driving means for causing said device to wind wire about a part of the armature, a loop forming mechanism, a timing member constantly driven and means through which said timing member successively causes arrest of the driving means for the wire laying device, and operation of said loop forming mechanism while the wire laying device remains stationary, said arresting means being adjustable whereby to vary the frequency with which said device is arrested and said loop forming means operated.

19. In a wire winding machine, means for supporting an armature, a wire laying device, driving means for causing said device to wind wire about a part of the armature, an electromagnetically operated stop for causing arrest of the wire laying device, a switch in the circuit of the electromagnetic circuit of said stop, and a timing member comprising a constantly rotated drum, and a dog carried by the drum for operating said switch, the drum having a circumferential guideway and the dog being adjustable upon said guideway whereby to vary the time of operation of said switch.

20. In a wire winding machine, means for supporting an armature, a wire laying device, driving means for causing said device to wind wire about a part of the mechanism, an electromagnetically operated stop for causing arrest of the wire laying device, a switch in the circuit of the electromagnetic circuit of said stop, and a timing member comprising a constantly rotated drum and a dog carried by said drum in position to operate said switch.

21. In an armature winding machine, a wire winding device, mechanism for driving said device, electromagnetic means for arresting said driving mechanism, a normally inoperative loop forming mechanism, electromagnetic means for operating said loop forming mechanism, normally open switches arranged side by side in the circuits of said electromagnetic means, and a timing member having means for closing said switches at predetermined intervals, whereby to cause successive arrest of the laying device and operation of the loop forming mechanism.

22. An armature winding machine comprising a support for an armature drum, an electromagnetic indexing mechanism for said drum, a wire laying device, means for operating said device including frictionally connected driving and driven members, an electromagnetically operated stop for arresting said driven member, said stop being normally inoperative, an electromagnetically controlled normally inoperative loop forming mechanism, switches in the circuits of the several controls for said mechanisms, a timing member constantly driven by the said driving member, and means carried by the timing member for operating said switches.

23. An armature winding machine comprising a support for an armature drum, an electromagnetic indexing mechanism for said drum, a wire laying device, means for operating said device including frictionally connected driving and driven members, an electromagnetically operated stop for arresting said driven member, said stop being normally inoperative, an electromagnetically controlled normally inoperative loop forming mechanism, switches in the circuits of the several controls for said mechanisms, a timing member constantly driven by the said driving member, and means carried by the timing member for operating said switches, said switch-operating means being adjustable and removable whereby to vary the time and frequency of operation of said switches.

24. In an armature winding machine, the combination with means for supporting an armature core and means for winding wire about portions of said core, a loop forming mechanism adapted to form loops in the wire, and studs arranged to receive the loops so formed and having a definite relation with the wire carrying parts of the core, whereby to hold said loops clear of the coil windings.

25. In an armature winding machine, an armature support on which an armature core is supported rotatably for indexing, said core having slots to receive windings of wire, a winding device arranged and operated to wind wire in slots of said core, a loop forming mechanism, and loop holding members equal in number to the slots of said core on which the loops formed by the forming mechanism are placed.

26. In an armature winding machine, an armature support on which an armature core is supported rotatably for indexing, said core having slots to receive windings of wire, a winding device arranged and operated to wind wire in slots of said core, a loop forming mechanism, and loop holding members equal in number to the slots of said core on which the loops formed by the forming mechanism are placed, said loop holding members being rotatable with the armature core, and adapted to hold the loops out of the way of subsequently placed windings of wire.

27. In an armature winding machine, the combination of means for supporting an armature core and means for winding wire about said core, loop forming means, a loop holding stud, and mechanism for causing said means to engage a strand of the wire and to form a loop from such strand and place such loop over said stud, said stud being out of the path of the wire winding means whereby to retain the loop out of the way of subsequently laid windings of the wire.

28. An armature winding machine including means for supporting an armature, an armature core having wire-receiving spaces mounted on said supporting means, loop-receiving holders in such association with said armature core as to hold loops engaged therewith out of the way of subsequently wound wire coils, a wire laying device for placing wire in certain spaces of the core, a loop forming member, and mechanism for operating said member to engage a turn of the wire, to draw off enough of the wire to form a loop, and place such loop upon one of the loop receiving holders.

29. In a wire winding machine a rotatably mounted crank arm, a wire leader carried by said crank arm in a manner permitting movement relatively thereto both in the direction of the axis of said crank and in a direction transverse to said axis, and a guide engaged with said wire layer, surrounding such axis, and having portions which are distorted from a plane perpendicular to said axis.

30. In a wire winding machine a rotatably mounted crank arm, a guide carried by said arm and movable angularly with respect thereto and to the axis about which said arm rotates, a wire leader supported by said guide and movable longitudinally thereof, whereby said guide is enabled to shift widely both longitudinally and laterally of said axis, and means for holding an armature core within the orbit of said guide with its axis extending across said orbit.

31. In a wire winding machine, a crank, a guide pivoted to the end of said crank so as to oscillate in a plane including the axis of the crank, and a wire leader supported by said guide and movable thereon approximately parallel to said axis.

32. In a wire winding machine, a wire leader, a guide or track for determining the path in which said leader may move, and a rotating driving arm connected flexibly to said leader in a manner permitting the latter to follow any irregularities of the guide.

33. In a wire winding machine, a guide or track forming a closed circuit and warped out of a plane, a wire leader adapted to travel upon said guide, a carrier swiveled to said leader and rolls arranged to embrace the guide, mounted on said carrier and adapted, through turning of the carrier on its swivel, to assume such positions when traversing warped portions of the guide as to avoid cramping and binding.

34. In a wire winding machine, a wire leader comprising a head, wire guiding means on said head, a holder swiveled upon said head, and rolls connected to said holder on parallel axes arranged upon respectively opposite sides of the swivel axis of the holder.

35. In a wire winding machine, a wire laying mechanism comprising a tubular shaft, a crank arm projecting from said shaft, a guide pivoted upon the end of said arm, a wire leader carried by said guide and movable thereon transversely of said arm, wire delivering means on said leader and yielding guiding and tension means for conducting a wire passing through the shaft to said delivery means.

36. A wire winding device comprising a tubular shaft through which a wire is adapted to pass, a guide roll mounted on said shaft in tangent relation to the passage therethrough, an arm swiveled to said shaft having a guide roll about which the wire is led from the first guide roll, a wire layer to which the wire is led from the second guide roll, the second guide roll being yieldingly actuated to maintain a bight in the wire between the first guide roll and the wire layer, a crank arm fixed to the shaft, and pivoted telescopic means carried on such arm on which said wire layer is mounted.

37. In a wire laying device, a flexible guide for determining the path in which said laying device travels, and mechanism for progressively displacing portions of said guide to enable successive turns of the wire to be laid side by side.

38. In a wire winding machine, a flexible guide, means for securing portions of said guide in a fixed position, displaceable holding means engaging intermediate portions of the guide, and automatic mechanism for progressively displacing said holding means.

39. In a wire winding machine, a flexible guide for a wire layer, holding means for holding opposite portions of said guide and said holding means being adjustable whereby to alter the relations of the portions held thereby, shifting means engaging intermediate portions of the guide, and mechanism for progressively displacing said shifting means.

40. In an armature winding machine, a loop forming mechanism comprising fingers adapted to be placed adjacent to the armature in position to receive a strand of the wire, means for withdrawing said fingers from the armature to draw off a loop of the wire, and a holder for receiving and retaining the loop so drawn.

41. In an armature winding machine, a loop forming mechanism comprising a pair of fingers arranged side by side with a space between them, carriers on which said fingers are mounted movable toward and away from the armature, means for so moving said carriers and fingers, and means for inverting the carriers and fingers.

42. In an armature winding machine, a loop forming mechanism comprising a pair of fingers arranged side by side with a space between them, carriers on which said fingers are mounted movable toward and away from the armature, means for so moving said carriers and fingers, and means for inverting the carriers and fingers, the said means being constructed, arranged and operated to actuate said fingers for drawing off a loop, then to invert the fingers, and then to move the inverted fingers toward the armature so as to draw the sides of the loop together.

43. In an armature winding machine, looping means, a motor tending to operate said means, and a magnetically operated escape mechanism for permitting said motor to operate said means in a series of steps.

44. In an armature winding machine in combination with means for winding wire about portions of an armature drum, a loop forming device, a retainer for a formed loop, motive mechanism tending to move said device, and an electromagnetically controlled escape mechanism for said motive mechanism arranged to cause said device to form a loop in the wire, and transfer such loop to said retainer.

45. In an armature winding machine in combination with means for supporting an armature core and means for winding wire about a portion of said core, a rotatably mounted stud carrier having a plurality of loop-receiving studs, mechanism for drawing off a portion of wire to form a loop and engaging the same with one of said studs, and means for indexing the armature drum, said carrier being geared to the drum to be indexed simultaneously therewith, and being rotatably mounted on an axis eccentric to the drum, and arranged in a plane so inclined to the drum as to maintain the distance between any stud and that part of the drum from which a loop extends to the stud uniform.

46. In an armature winding machine, means for supporting an armature core in a manner permitting rotation for indexing, a pair of rods movable endwise toward and away from said drum parallel to the axis thereof, a finger projecting laterally from each of said rods, motive mechanism constructed to advance said rods toward the armature core, turn them so that the fingers thereon project upwardly, withdraw the rods, rotate the rods simultaneously in directions causing the fingers to turn toward each other and to be inverted, and return the rods toward the core with the fingers thus inverted, wire laying means arranged to wind wire about a portion of the core in a course which causes the wire to pass around said fingers when the latter are in their upright position adjacent to the drum, and a rotatably mounted annulus embracing the path of said rods between the limits of movement of the fingers and having an inwardly projecting stud between the paths of the two rods and approximately in the plane thereof, and a deflector connected to the annulus passing from the rim thereof on the side toward the drum across the end of the stud.

47. In an armature winding machine in combination with means for supporting an armature core, a wire laying device, means for propelling said device in an orbit about the portion of the core on which wire is wound, and a guide engaged with said wire laying device having an outline conforming generally to the outline of the coil to be wound and arranged in respect to the armature in position to constrain said laying device to travel in a path conforming to such outline.

48. In an armature winding machine, a track or guide having a closed outline and supporting means holding parts of said track, said supporting means being adjustable to warp the parts of the track held thereby.

49. In a wire winding machine, a supporting arm, frames hung from said arm and adjustable thereon, clamps mounted on said frames and adjustable angularly thereon, and an annular track or guide arranged between said frames and having its opposite side portions engaged respectively with said clamps.

In testimony whereof I have affixed my signature.

NEWTON CRANE.